(12) United States Patent
Lee et al.

(10) Patent No.: US 9,559,819 B2
(45) Date of Patent: Jan. 31, 2017

(54) DATA SIGNAL TRANSMITTING METHOD AND DATA SIGNAL RECEIVING METHOD IN WIRELESS COMMUNICATION SYSTEM

(71) Applicant: hyBee, Inc., Gyeonggi-Do (KR)

(72) Inventors: Yong-Hwan Lee, Seoul (KR); Jin Seok Han, Gunpo-si (KR); Jae Seok Bang, Busan (KR)

(73) Assignee: hyBee, Inc., Gyeonggi-do (KR)

( * ) Notice: Subject to any disclaimer, the term of this patent is extended or adjusted under 35 U.S.C. 154(b) by 218 days.

(21) Appl. No.: 14/606,688

(22) Filed: Jan. 27, 2015

(65) Prior Publication Data

US 2015/0215092 A1   Jul. 30, 2015

(30) Foreign Application Priority Data

Jan. 28, 2014 (KR) ........................ 10-2014-0010067

(51) Int. Cl.
| | |
|---|---|
| *H04L 5/00* | (2006.01) |
| *H04W 28/06* | (2009.01) |
| *H04W 52/02* | (2009.01) |
| *H04L 1/00* | (2006.01) |
| *H04W 28/22* | (2009.01) |

(52) U.S. Cl.
CPC ........... *H04L 5/0044* (2013.01); *H04L 1/0002* (2013.01); *H04L 1/0015* (2013.01); *H04L 5/0062* (2013.01); *H04L 5/0064* (2013.01); *H04W 28/06* (2013.01); *H04W 52/0216* (2013.01); *H04W 52/0219* (2013.01); *H04W 28/22* (2013.01)

(58) Field of Classification Search
CPC .... H04L 5/0044; H04L 5/0064; H04L 5/0062; H04L 1/0002; H04L 1/0015; H04W 25/06; H04W 48/00; H04W 52/0216; H04W 52/0219; H04W 28/22
See application file for complete search history.

(56) References Cited

U.S. PATENT DOCUMENTS

| | | | | |
|---|---|---|---|---|
| 2004/0192222 | A1* | 9/2004 | Vaisanen | H04B 1/44 455/78 |
| 2005/0147074 | A1* | 7/2005 | Maufer | H04W 52/04 370/338 |
| 2005/0152321 | A1* | 7/2005 | Maufer | H04W 52/04 370/338 |
| 2006/0270343 | A1* | 11/2006 | Cha | H04B 7/0413 455/25 |
| 2008/0085735 | A1* | 4/2008 | Lin | G08B 21/24 455/556.1 |

(Continued)

OTHER PUBLICATIONS

LAN/MAN Standards Committee, IEEE Standard for Local and Metropolitan Area Networks—Part 15.4: Low-Rate Wireless Personal Area Networks (LR-WPANs), IEEE Std 802.15.4, Sep. 5, 2011, p. 1-314, New York, USA.

(Continued)

*Primary Examiner* — Ajay Cattungal
(74) *Attorney, Agent, or Firm* — The Webb Law Firm

(57) ABSTRACT

Provided is data signal transmitting method and data signal receiving method in a wireless communication system. A method of transmitting and receiving data signal in a wireless communication system by changing a transmission speed and a payload size included in the data signal according to an operation environment is disclosed.

10 Claims, 7 Drawing Sheets

(56) References Cited

U.S. PATENT DOCUMENTS

| | | | | |
|---|---|---|---|---|
| 2009/0147732 A1* | 6/2009 | Tsao | ...................... | H04W 28/22 |
| | | | | 370/328 |
| 2010/0066503 A1* | 3/2010 | Rhie | ........................ | G01S 1/68 |
| | | | | 340/10.1 |
| 2010/0130244 A1* | 5/2010 | Hong | ................ | H04W 72/1231 |
| | | | | 455/522 |
| 2011/0255526 A1* | 10/2011 | Kaneko | .................. | H04B 7/022 |
| | | | | 370/338 |
| 2013/0335584 A1* | 12/2013 | Kato | ...................... | G06F 3/005 |
| | | | | 348/207.1 |
| 2014/0140332 A1* | 5/2014 | Jung | .................... | H04W 48/20 |
| | | | | 370/338 |

OTHER PUBLICATIONS

LAN/MAN Standards Committee, IEEE Standard for Local and Metropolitan Area Networks—Part 15.4: Low-Rate Wireless Personal Area Networks (LR-WPANs) Amendment 1: MAC Sublayer, IEEE Std 802.15.4e, Apr. 16, 2012, p. 1-225, New York, USA.

* cited by examiner

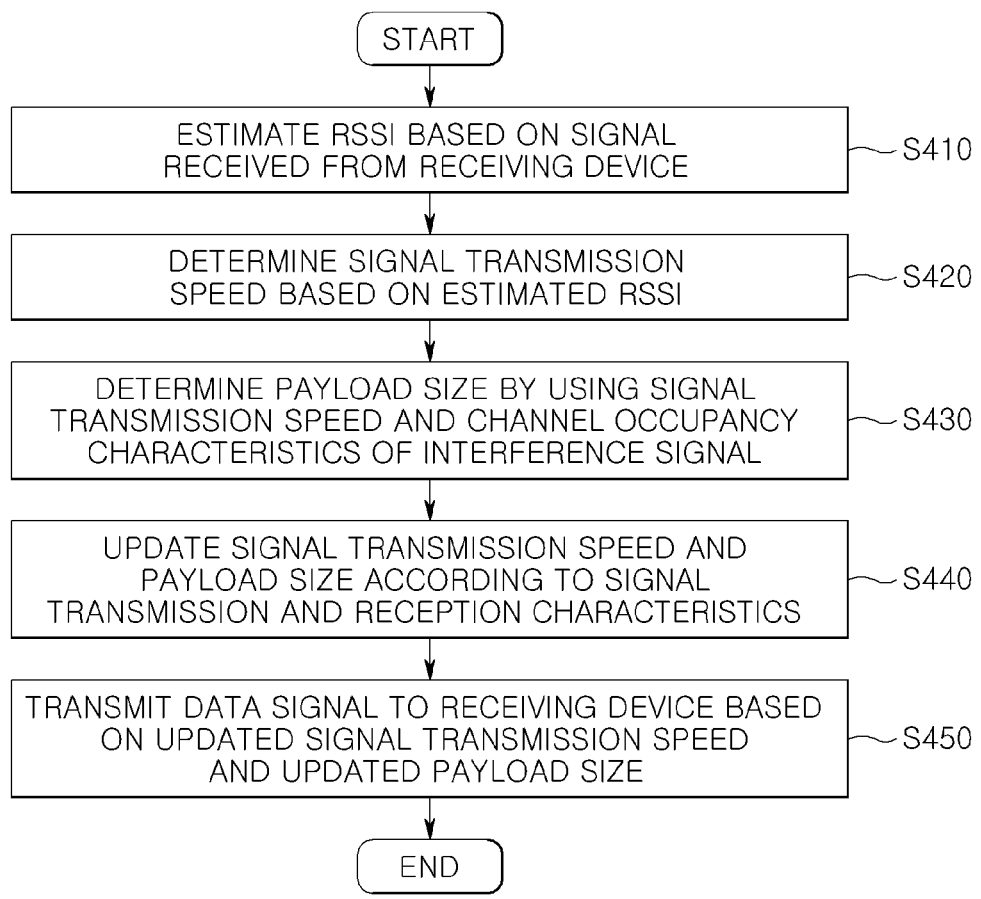

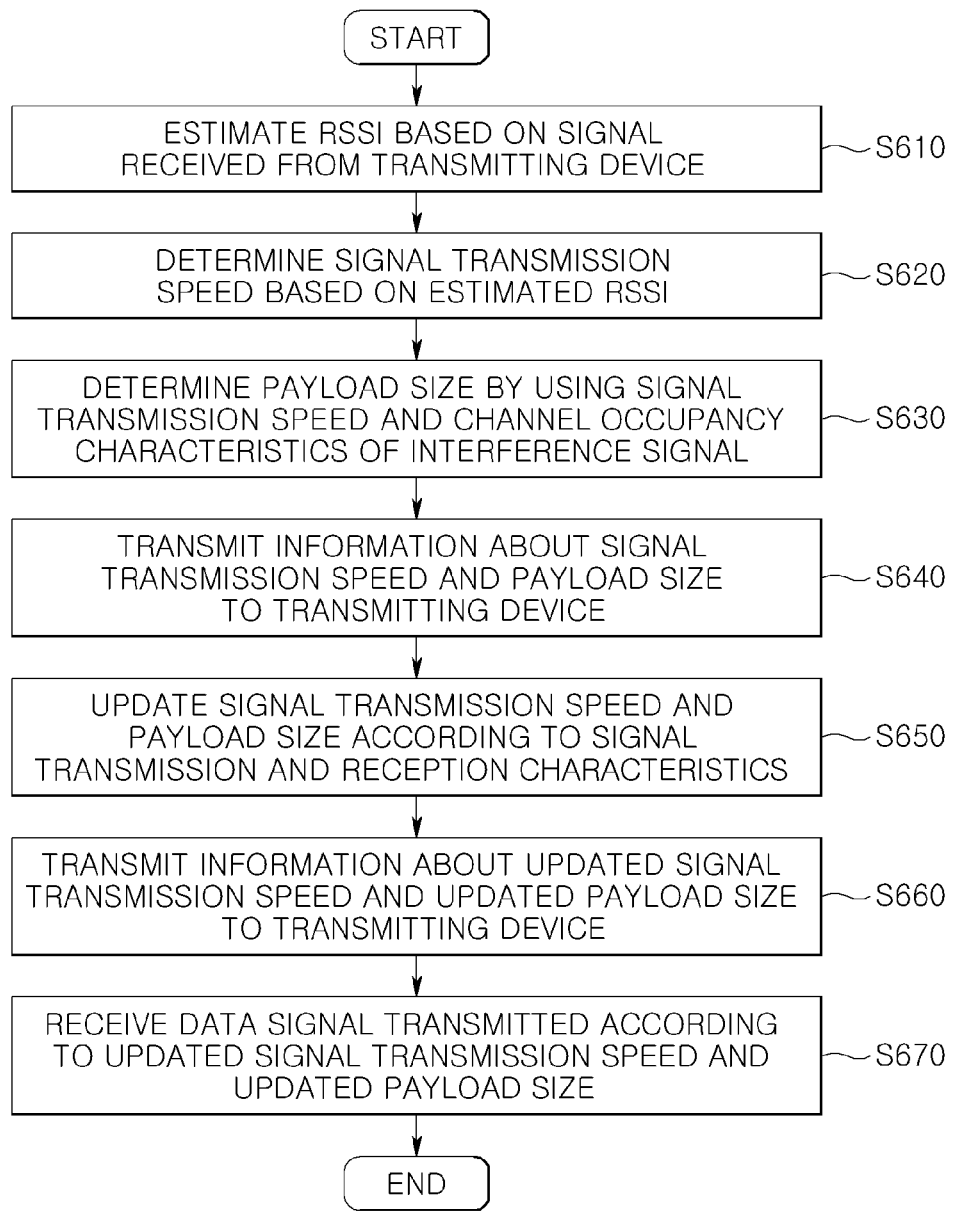

DATA SIGNAL TRANSMITTING METHOD AND DATA SIGNAL RECEIVING METHOD IN WIRELESS COMMUNICATION SYSTEM

CROSS-REFERENCE TO RELATED APPLICATION

This application claims priority to Korean Patent Application No. 10-2014-0010067 filed Jan. 28, 2014, the disclosure of which is hereby incorporated in its entirety by reference.

BACKGROUND OF THE INVENTION

1. Field of the Invention

The present invention relates to data signal transmitting method and data signal receiving method in a wireless communication system, and more particularly, to a method of transmitting and receiving data signal in a wireless communication system by changing a transmission speed and a payload size included in the data signal according to an operation environment.

2. Description of the Related Art

In a wireless sensor network (WSN), since each sensor device uses a limited power source, such as a battery, a communication technology reducing power consumption is indispensible. For example, in IEEE 802.15.4 that is a type of WSN medium access control (MAC) method, power consumption is reduced by enabling communication devices in a system to transmit and receive data only in an active interval and stopping the communication devices from operating in an idle or inactive interval, by using a beacon-enabled mode that periodically uses a transmission frame including a synchronizing signal transmitting interval, a transmitting interval, and an idle interval. Here, a beacon frame that is a network synchronizing signal periodically transmitted for synchronization of transmitting periods between the communication devices in the WSN includes information of a transmitting interval and idle interval, scheduling information for assigning an independent resource to a communication device, and information notifying a communication device that there is a packet to be transmitted.

When a plurality of wireless communication systems of different types or same type, which share the same frequency band, exist, a direct sequence spread spectrum (DSSS) system reduces an effect of an interference signal within a band via a spread spectrum technique. For example, in IEEE 802.15.4 that is a type of the DSSS system, a transmission signal is spread and transmitted so as to obtain a processing gain with respect to a narrowband interference signal. However, a performance of IEEE 802.15.4 DSSS is not largely effective when a frequency static interference signal that causes interference for a relatively long interval of time in a wide frequency band, such as a wireless local area network (WLAN), exists. In detail, in the beacon-enabled mode of IEEE 802.15.4, since the beacon frame is simply periodically transmitted, when an interference signal exists in a channel being used, a transmission performance of the beacon frame is remarkably deteriorated and thus severe power consumption and performance deterioration are induced due to signal transmission delays and repeated attempts to receive a synchronization signal by the communication devices. Also, when the communication device is unable to continuously receive a beacon frame, the communication device may change to an orphan device by losing synchronization with a main communication device (hereinafter, referred to as a coordinator) of a system, and a long time is taken and a large amount of power is consumed during a re-joining process for re-connecting to a network. Thus, when same or different type interference signals exist, the beacon-enabled mode of IEEE 802.15.4 not only deteriorates network connectivity, but also seriously deteriorates a data transmission performance.

Accordingly, techniques for increasing network connectivity and a data transmission performance in an environment having interference in a channel being used have been suggested. For example, various techniques, such as a deferred beacon method (DBM) of IEEE 802.15.4e MAC enhancement for reliably transmitting a control message in an environment having interference in a channel being used, a technique for increasing a data transmission performance by changing a transmission speed according to channel environments (hereinafter, referred to as dynamic rate adaption and control for energy reduction (DRACER)), and a technique for increasing a data transmission performance by varying a packet size according to channel environments (hereinafter, referred to as white-space aware frame adaption (WISE), have been suggested. However, since most techniques do not consider various operation environments that may occur in an actual environment, a network performance may deteriorate, and in addition, such most techniques do not consider transmission of control messages and data signals in overall, and thus performance improvement is inadequate.

For example, since the DBM depends upon a channel sensing result of a coordinator, a performance may largely deteriorate in an environment (for example, a hidden node environment) in which an interference signal effect is high only to some communication devices. Also, when a packet error occurs, the DRACER reduces a signal transmission speed by increasing a DSSS code rate by determining that a channel state is deteriorated, but if the packet error is generated by an interference signal, a transmission time of an actual signal is increased since a packet size is fixed and the signal transmission speed is reduced, and thus the DRACER may become more vulnerable to the interference signal and a performance may rather deteriorate. Also, in the WISE, characteristics of an interference signal in the same channel are recognized and a payload size is determined to split and transmit data, but since the WISE does not consider variation of a transmission speed according to channel states, and thus performance improvement is insignificant.

SUMMARY OF THE INVENTION

One or more embodiments of the present invention include data signal transmitting method and data signal receiving method in a wireless communication system, which increase a data throughput and power efficiency by changing a transmission speed and a payload size even in an environment having an interference signal and fading in a channel.

According to one or more embodiments of the present invention, data signal transmitting method performed by a transmitting device in a wireless communication system wherein a main communication device transmits and receives data signal including a header and a payload to and from a plurality of devices by periodically using a transmission frame including a beacon signal transmitting interval, data signal transmitting interval assigned to each of devices, and data signal transmission resting interval, the data signal transmitting method includes: determining a signal transmission speed of the payload based on a received signal strength indicator (RSSI) after estimating the RSSI based on a signal received by a transmitting device to which the data signal transmitting interval is assigned from a receiving device before the data signal transmitting interval starts; determining a payload size that maximizes a data throughput by using the determined signal transmission speed and a channel occupancy ratio of an interference signal with respect to a communication channel of the wireless communication system; updating the determined signal transmission speed and the determined payload size such that the data throughput increases according to signal transmission and reception characteristics in the data signal transmitting interval; and transmitting the data signal to the receiving device based on the updated signal transmission speed and the updated payload size.

According to one or more embodiments of the present invention, data signal receiving method performed by a receiving device in a wireless communication system wherein a main communication device transmits and receives data signal including a header and a payload to and from a plurality of devices by periodically using a transmission frame including a beacon signal transmitting interval, data signal transmitting interval assigned to each of devices, and data signal transmission resting interval, the data signal receiving method includes: determining a signal transmission speed of the payload based on an RSSI after estimating the RSSI based on a signal received by a receiving device to which the data signal transmitting interval is assigned from a transmitting device before the data signal transmitting interval starts; determining a payload size that maximizes a data throughput by using the determined signal transmission speed and channel occupancy characteristics of an interference signal with respect to a communication channel of the wireless communication system; transmitting information about the determined signal transmission speed and the determined payload size to the transmitting device; updating the determined signal transmission speed and the determined payload size such that the data throughput increases according to signal transmission and reception characteristics in the data signal transmitting interval; transmitting information about the updated signal transmission speed and the updated payload size to the transmitting device; and receiving the data signal that is transmitted according to the updated signal transmission speed and the updated payload size from the transmitting device.

ADVANTAGEOUS EFFECTS

According to one or more embodiments of the present invention, data signal transmitting method and data signal receiving method in a wireless communication system may increase a data throughput and power efficiency by changing a transmission speed and a payload size even in an environment having an interference signal and fading in a channel.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a flowchart of data signal transmitting method according to an embodiment of the present invention;

FIG. 6 is a flowchart of data signal receiving method according to an embodiment of the present invention.

DESCRIPTION OF THE PREFERRED EMBODIMENTS

Figure 1:
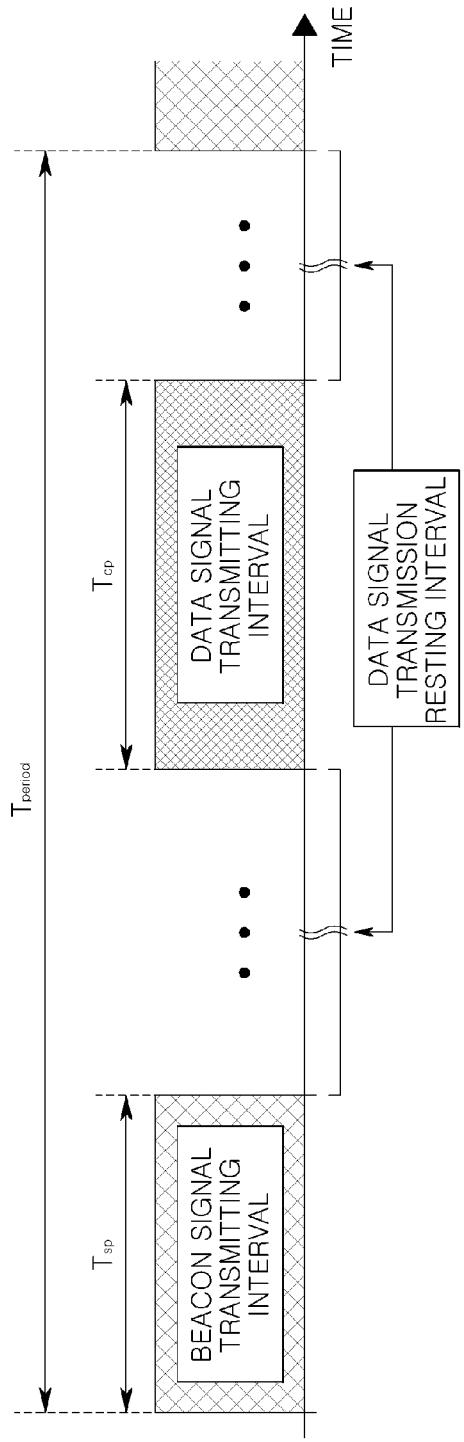
FIG. 1 is a diagram of a transmission frame of a wireless communication system, according to an embodiment of the present invention.

Herein below, exemplary embodiments of the present invention will be described in detail with reference to the accompanying drawings. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims. Throughout the specifications, the same reference numerals will refer to the same parts.

According to exemplary embodiments of the present invention, the word "unit" may refer to a software component or hardware component such as an FPGA or ASIC capable of carrying out a function or an operation. However, "unit" is not limited to hardware or software. A unit may be configured so as to reside in an addressable storage medium or to drive one or more processors. Units may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units, or further divided into units along with other components.

FIG. 1 is a diagram of a transmission frame of a wireless communication system, according to an embodiment of the present invention.

An embodiment of the present invention relates to a wireless communication system wherein a main communication device transmits and receives data signal to and from a plurality of devices by periodically using a transmission frame including a beacon signal transmitting interval, data signal transmitting interval, and data signal transmission resting interval for system synchronization and signal transmission scheduling. Here, a period $T_{period}$ of the transmission frame may be represented by Equation 1 below.

$$T_{period}=T_{sp}+T_{cp}+T_{sleep}$$ [Equation 1]

Here, $T_{cp}$ denotes a interval of the data signal transmitting interval, and $T_{sp}$ and $T_{sleep}$ respectively denote intervals of the beacon signal transmitting interval and the data signal transmission resting interval.

Figure 2:
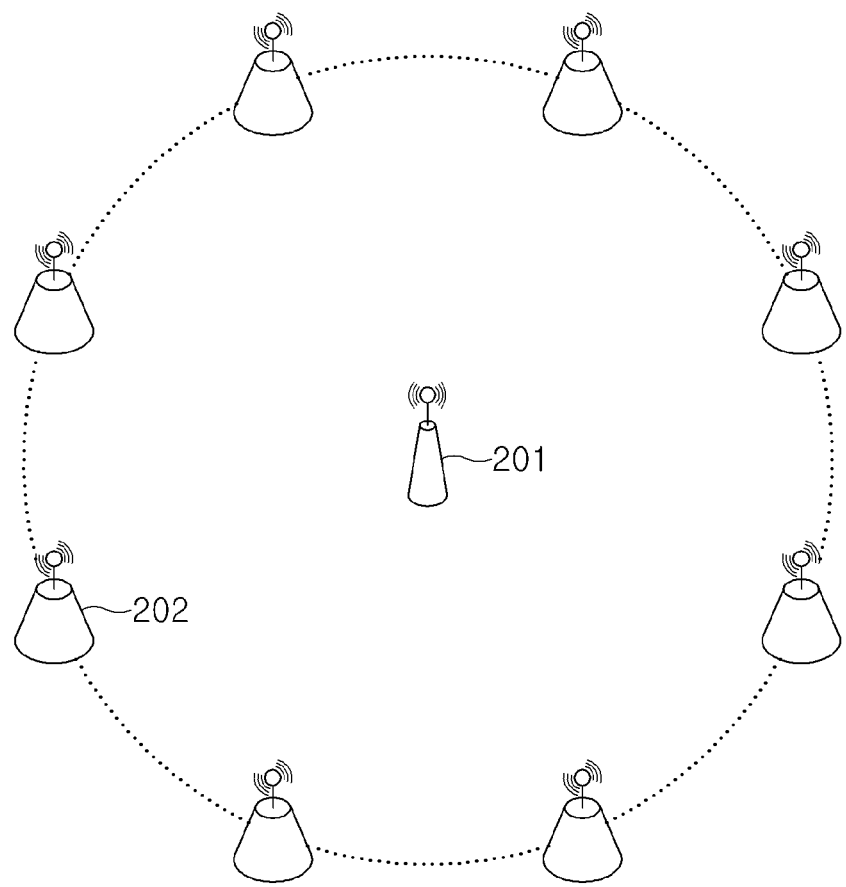
FIG. 2 is a diagram of topology of a wireless communication system, according to an embodiment of the present invention.

The wireless communication system is not limited to a network structure including one transmitting device and one receiving device, and may include a general scenario of a coordinator and a target communication device transferring data signal therebetween in a redundant device wireless communication system having a star topology structure including one coordinator 201 and a plurality of communication devices 202 as shown in FIG. 2.

A basic signal transmission protocol considered in one or more embodiments of the present invention is an automatic repeat request (ARQ) protocol. The ARQ protocol uses two signals, i.e., data signal and an acknowledgement (ACK) signal. The data signal and the ACK signal may have a packet form.

A transmitting device transmits data signal to a receiving device, and upon properly receiving the data signal, the receiving device transmits an ACK signal to the transmitting device as a response to the reception of the data signal. Upon receiving the ACK signal, the transmitting device transmits a following data signal to the receiving device, but when the transmitting device does not receive the ACK signal, the transmitting device re-transmits the data signal so as to increase transmission reliability.

Figure 3:
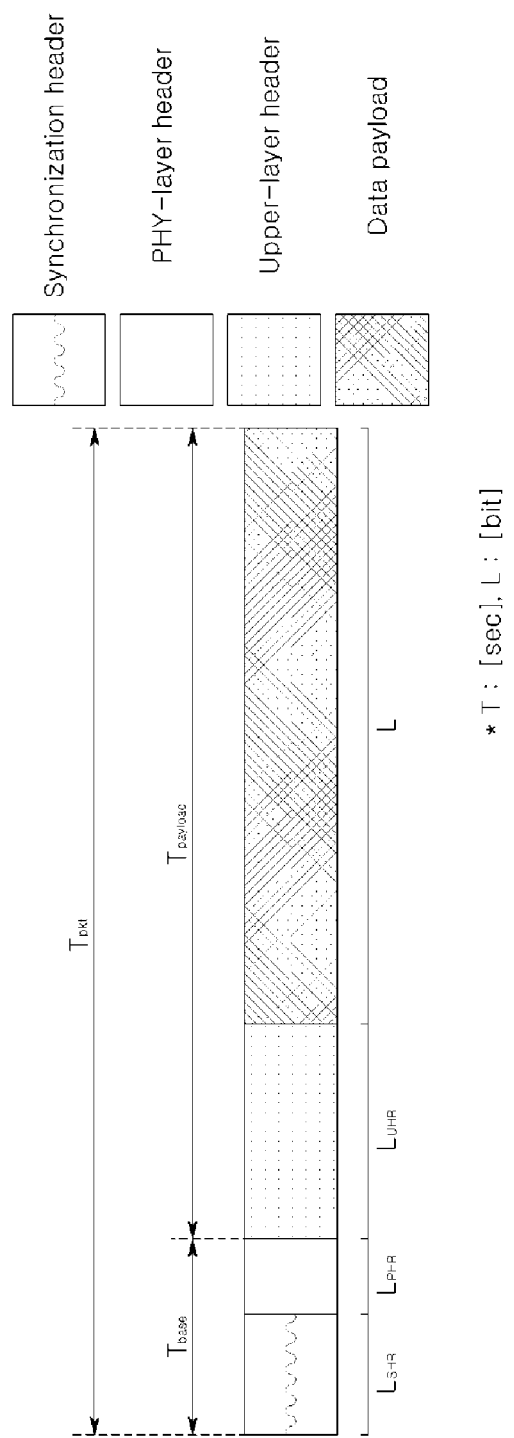
FIG. 3 is a diagram of a structure of data signal, according to an embodiment of the present invention.

FIG. 3 is a diagram of a structure of data signal, according to an embodiment of the present invention. An embodiment of the present invention relates to a signal structure including a synchronization header (SHR), a physical-layer header (PHR), an upper-layer header (UHR), and a payload. The data signal inserts data to be actually transmitted to a payload, and the ACK signal does not include a payload. Here, a interval $T_{pkt}$ of a signal may be represented by Equation 2 below.

$$T_{pkt} = T_{base} + T_{payload} \qquad \text{[Equation 2]}$$
$$= \frac{L_{SHR} + L_{PHR}}{R_{base}} + \frac{L_{UHR} + L}{R}$$

In Equation 2, $T_{base}$ denotes a transmission interval of an SHR and a PHR, $T_{payload}$ denotes a transmission interval of an UHR and a payload, $R_{base}$ denotes a transmission speed of transmitting the SHR and the PHR, R denotes a transmission speed of transmitting the UHR and the payload, and $L_{SHR}$, $L_{PHR}$, $L_{UHR}$, and L respectively denote bit numbers of the SHR, the PHR, the UHR, and the payload.

Data signal transmitting method according to an embodiment of the present invention assumes that data signal transmitting interval is scheduled to a coordinator and a communication device in a wireless communication system.

A process of scheduling a downlink data signal transmitting interval wherein a coordinator transmits data signal to a communication device will now be described. The coordinator transmits a downlink scheduling message including scheduling information about data signal transmitting interval, such as an address of the communication device, a start time of the data signal transmitting interval, and a length of the data signal transmitting interval, to the communication device. Upon receiving the downlink scheduling message, the communication device notifies the coordinator that scheduling of the data signal transmitting interval is successfully performed by transmitting a downlink scheduling response message to the coordinator. Upon receiving the downlink scheduling response message from the communication device, the coordinator transmits an ACK message to the communication device as a response to the reception of the downlink scheduling response message, thereby completing signal transmitting interval scheduling, wherein the coordinator is a transmitting device and the communication device is a receiving device.

Next, a process of scheduling an uplink data transmitting interval wherein a communication device transmits data signal to a coordinator will now be described. The communication device transmits an uplink scheduling request message to the coordinator in a beacon signal transmitting interval. Upon receiving the uplink scheduling request message, the coordinator transmits an uplink scheduling message including signal transmitting interval scheduling information, such as an address of the communication device, a start time of data signal transmitting interval, and a length of the data signal transmitting interval, to the communication device. Upon receiving the uplink scheduling message, the communication device notifies the coordinator that signal transmitting interval scheduling is successfully performed by transmitting an uplink scheduling response message to the coordinator. Upon receiving the uplink scheduling response message from the communication device, the coordinator transmits a response message to the communication device as a response to the reception of the uplink scheduling response message, thereby completing the signal transmitting interval scheduling, wherein the communication device is a transmitting device and the coordinator is a receiving device.

Hereinafter, data signal transmitting method according to an embodiment of the present invention will be described in detail with reference to FIG. 4.

In operation S410, a transmitting device to which data signal transmitting interval is assigned estimates a received signal strength indicator (RSSI) based on a signal received from a receiving device before the data signal transmitting interval starts.

The transmitting device may estimate the RSSI via a scheduling-related signal received from the receiving device while scheduling for the receiving device and the data signal transmitting interval is performed. For example, when a coordinator is the transmitting device, the coordinator may estimate the RSSI by receiving a downlink scheduling response message from the communication device, and when the communication device is the transmitting device, the communication device may estimate the RSSI by receiving an uplink scheduling message from the coordinator.

When a plurality of scheduling-related signals are received from the receiving device, the transmitting device may estimate the RSSI by a weighted average value of RSSIs with respect to the scheduling-related signals.

In operation S420, the transmitting device determines a transmission speed of a payload (hereinafter, referred to a signal transmission speed) based on the estimated RSSI. In detail, when the RSSI is estimated, the transmitting device may compare the RSSI with a minimum RSSI preset to each of signal transmission speeds, and when data signal including a payload having a certain size is to be transmitted to the receiving device, the transmitting device may determine a highest signal transmission speed among the selectable signal transmission speeds as the signal transmission speed.

When $\Theta$ denotes an index set of a transmitting method usable by the transmitting device, a set $\Omega$ of transmission speeds may be represented by Equation 3 below.

$$\Omega = \{R_i | i \in \Theta\} \qquad \text{[Equation 3]}$$

Here, $R_i$ denotes a signal transmission speed when a transmitting method i is used, and $\Omega$ and $\Theta$ correspond to one-to-one. The transmitting device may determine a signal transmission speed $\hat{R}$ according to Equation 4 below while considering an RSSI.

$$\hat{R} = \max\{R_i | \text{RSSI} - \gamma_{R_i} \geq \Delta_{R_i}, i \in \Theta\} \qquad \text{[Equation 4]}$$

Here, $\gamma_{R_i}$ denotes a minimum reception signal strength required for the transmitting method i, and $\Delta_{R_i}$ is a threshold value that is arbitrarily determined by considering channel shadowing or fading.

In operation S430, the transmitting device determines a payload size that maximizes a data throughput by using the determined signal transmission speed and channel characteristics of an interference signal in a channel of a wireless communication system.

The transmitting device may estimate characteristics of an interference signal in a channel via an ordinary channel sensing technique during an idle interval wherein a wireless communication system does not use a channel. Channel occupancy characteristics of an interference signal may include a channel occupancy ratio of the interference signal and an idle time of the interference signal.

For example, a channel occupancy ratio of an interference signal may be estimated according to Equation 5 below.

$$\tilde{P}_w = \frac{1}{N_{sense}} \sum_{j=1}^{N_{sense}} u(P_j - \lambda_{sense}) \quad \text{[Equation 5]}$$

Here, $u(\cdot)$ denotes a unit step function, $P_j$ denotes a strength of signal received during a j-th channel sensing process, $\lambda_{sense}$ denotes a threshold value for determining the existence of an interference signal, and $N_{sense}$ denotes a number of times channel sensing is performed.

Also, the idle interval of an interference signal may be estimated according to Equation 6 below.

$$\tilde{T}_w = \frac{1}{N_{idle}} \sum_{j=1}^{N_{idle}} n_{j,idle} T_{sense} \quad \text{[Equation 6]}$$

Here, $N_{idle}$ denotes a number of times an idle interval of an interference signal is detected ($N_{idle} \leq N_{sense}$), $n_{j,idle}$ denotes the length of a j-th detected idle interval of the interference signal, and $T_{sense}$ denotes an interval of performing channel sensing. For example, when $N_{sense}$ is 10, $T_{sense}$ is 320 us, and a channel sensing result of $N_{sense}$ is {O, X, X, O, O, O, X, X, X, X}, wherein O indicates the existence of interference signal in a channel, a channel occupancy ratio $\tilde{P}_w$ of the interference signal is estimated to be 0.4 (=4/10) and an idle interval $\tilde{T}_w$ of the interference signal is estimated to be 960 us (=0.5×(2+4)×320 us).

The transmitting device may determine the payload size that maximizes data throughput by using the determined signal transmission speed and the channel occupancy characteristics of the interference signal as follows.

A transmission protocol of data signal assumes both a protocol that does not perform channel sensing before transmitting data signal in data signal transmitting interval, and a protocol that transmits data signal when it is determined that a channel is idle by performing channel sensing before transmitting the data signal.

When the existence of an interference signal in a channel being used is modeled by a 2-state Markov chain, a data throughput S of each signal transmission protocol may be represented by Equation 7 below.

$$S = \quad \text{[Equation 7]}$$
$$\begin{cases} R\dfrac{L}{L+a}(1-\rho_w)\exp\left(-\dfrac{L+b}{RT_w}\right) & \text{without channel sensing} \\ R\dfrac{L}{L+c}\exp\left(-\dfrac{L+d}{RT_w}\right) & \text{with channel sensing} \end{cases}$$

Here, R denotes a signal transmission speed, L denotes a payload size (i.e., a number of bits of a payload), $\rho_w$ denotes a channel occupancy ratio of an interference signal, $T_w$ denotes an average idle time of the interference signal, and a, b, c and d are values indifferent from L and are respectively represented by Equations 8 through 11.

$$a = \left\{\frac{2(L_{SHR}+L_{PHR})}{R_{base}} + \frac{L_{UHR}^{data}}{R} + \frac{L_{UHR}^{ack}}{R} + 2T_{TA}\right\}R \quad \text{[Equation 8]}$$

$$b = \left\{\frac{2(L_{SHR}+L_{PHR})}{R_{base}} + \frac{L_{UHR}^{data}}{R} + \frac{L_{UHR}^{ack}}{R} + T_{TA}\right\}R \quad \text{[Equation 9]}$$

$$c = \left\{T_{unit}^{cca} + \rho_w\left(\frac{T_{unit}^{cca}+T_w}{2}\right) + \frac{2(L_{SHR}+L_{PHR})}{R_{base}} + \frac{L_{UHR}^{data}}{R} + \frac{L_{UHR}^{ack}}{R} + 2T_{TA}\right\}R \quad \text{[Equation 10]}$$

$$d = \left\{T_{unit}^{cca} + \frac{2(L_{SHR}+L_{PHR})}{R_{base}} + \frac{L_{UHR}^{data}}{R} + \frac{L_{UHR}^{ack}}{R} + T_{TA}\right\}R \quad \text{[Equation 11]}$$

Here, $L_{UHR}^{data}$ and $L_{UHR}^{ack}$ respectively denote a number of bits of UHR of data signal and an ACK signal, $T_{TA}$ denotes a switching time between a transmission mode and a reception mode of a transceiver, and $T_{unit}^{cca}$ denotes a time interval for performing channel sensing.

An optimum data payload size that maximizes data throughput of each signal transmission protocol of Equation 7 may be represented by Equation 12.

$$L_{opt} = \begin{cases} \sqrt{\left(\frac{a}{2}\right)^2 + aRT_w} - \frac{a}{2}; & \text{without channel sensing} \\ \sqrt{\left(\frac{c}{2}\right)^2 + cRT_w} - \frac{c}{2}; & \text{with channel sensing} \end{cases} \quad \text{[Equation 12]}$$

Referring to Equation 12 above, it is determined that a payload size that maximizes data throughput increases as a signal transmission speed and an idle time of an interference signal increase. Accordingly, a size $\hat{L}$ of a payload may be determined according to Equation 13 with the use of the determined transmission speed $\hat{R}$ and the estimated idle time $\tilde{T}_w$ of the interference signal.

$$\hat{L} = \begin{cases} \sqrt{\left(\frac{a}{2}\right)^2 + a\hat{R}\tilde{T}_w} - \frac{a}{2}; & \text{without channel sensing} \\ \sqrt{\left(\frac{c}{2}\right)^2 + c\hat{R}\tilde{T}_w} - \frac{c}{2}; & \text{with channel sensing} \end{cases} \quad \text{[Equation 13]}$$

A default value of the determined size $\hat{L}$ of the payload may be limited by a maximum or minimum value of a payload size of the system.

Another signal transmission protocol may consider a method wherein, when a receiving device determines that a channel is idle by performing channel sensing during data signal transmitting interval, the receiving device transmits a clear-to-send message to a transmitting device such that the transmitting device transmits data signal to the receiving device. When such a method is used, an optimum payload size may be determined by simply modifying the equation for data throughput, i.e., Equation 7.

In operation S440, the transmitting device may update the determined signal transmission speed and the determined payload size such that data throughput increases according to signal transmission and reception characteristics in a data signal transmitting interval. The signal transmission and reception characteristics may include at least one of RSSIs of signal received in a data signal transmitting interval, information about whether transmission of data signal is successful or not, a transmission error rate of data signal, and a transmission performance value of data signal.

The signal transmission speed and the payload size may be updated as the transmitting device sets a period of updating the signal transmission speed in a data signal transmitting interval, and updates the signal transmission speed by using the RSSI estimated according to the update period. The RSSI may be estimated via an ACK signal received from the receiving device during the data signal transmitting interval.

Once the RSSI is estimated, the transmitting device may compare the estimated RSSI with a minimum RSSI predetermined for each of signal transmission speeds, and when data signal including a payload of a certain size is transmitted to a receiving device, may update the signal transmission speed to a highest signal transmission speed among plural signal transmission speeds available to the transmitting device.

Then, the transmitting device may determine a period of updating the payload size in the data signal transmitting interval, and periodically update the payload size based on the channel occupancy characteristics of interference signal at an update period. However, since data signal is transmitted or received in the data signal transmitting interval, it is difficult to estimate the channel occupancy characteristics of interference signal in a channel through channel sensing.

Accordingly, the transmitting device may estimate the channel occupancy characteristics of interference signal by exploiting the transmission error rate of data signal as follows.

Modeling the existence of interference signal in a channel being used as a 2-state Markov chain, the transmission error rate P of each signal transmission protocol may be represented by Equation 14 below.

$$p = \begin{cases} 1 - (1 - \rho_w)\exp\left(-\frac{L+b}{RT_w}\right); & \text{without channel sensing} \\ 1 - \exp\left(-\frac{L+d}{RT_w}\right); & \text{with channel sensing} \end{cases}$$ [Equation 14]

According to Equation 14, the transmitting device may estimate the idle time $\tilde{T}_w$ of the interference signal by using a transmission error rate $\tilde{p}$ measured during the update period of the payload size in the data signal transmitting interval according to Equation 15.

$$\tilde{T}_w = \begin{cases} \frac{\hat{L}+b}{\hat{R}} \times \frac{1}{\ln\{(1-\tilde{\rho}_w)/(1-\tilde{p})\}}; & \text{without channel sensing} \\ \frac{\hat{L}+d}{\hat{R}} \times \frac{1}{\ln\{1/(1-\tilde{p})\}}; & \text{with channel sensing} \end{cases}$$ [Equation 15]

Here, $\hat{R}$ and $\hat{L}$ respectively denote a signal transmission speed and the payload size, which are used in a current update period. The idle time of the interference signal may be represented by an average value or a weighted average value.

The transmitting device may determine a data payload size $\hat{L}_{new}$ according to Equation 16 by using the updated signal transmission speed $\hat{R}_{new}$ and the estimated idle time $\tilde{T}_w$ of interference signal.

$$\hat{L}_{new} = \begin{cases} \sqrt{\left(\frac{a}{2}\right)^2 + a\hat{R}_{new}\tilde{T}_w} - \frac{a}{2}; & \text{without channel sensing} \\ \sqrt{\left(\frac{c}{2}\right)^2 + c\hat{R}_{new}\tilde{T}_w} - \frac{c}{2}; & \text{with channel sensing} \end{cases}$$ [Equation 16]

The determined data payload size $\hat{L}_{new}$ may be limited by a maximum or minimum value of a payload size of the system.

In operation S450, the transmitting device may transmit data signal to the receiving device based on the updated signal transmission speed and the updated payload size.

Meanwhile, the updating of the signal transmission speed and the payload size described above is based on mathematical analysis, and the optimum payload size that maximizes data throughput is theoretically derived, but the calculation of the optimum size in practice may require accurate estimation of characteristics of interference signal in a channel, and complicated calculation, such as square roots and natural logarithm.

Figure 5A:
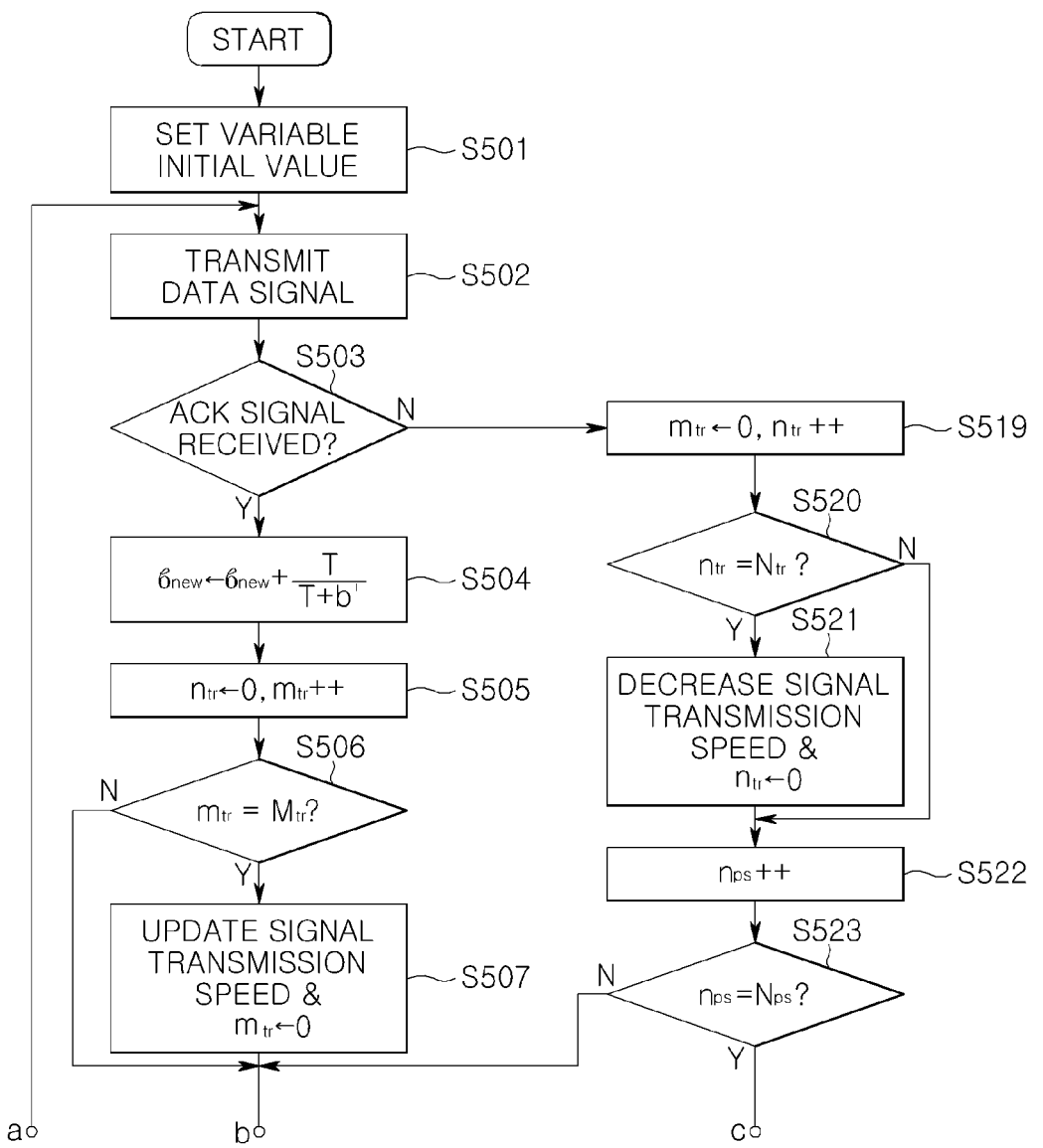
FIG. 5A and FIG. 5B are flowchart of a method of updating a signal transmission speed and a payload size with respect to data signal transmitting method, according to an embodiment of the present invention.
Figure 5B:
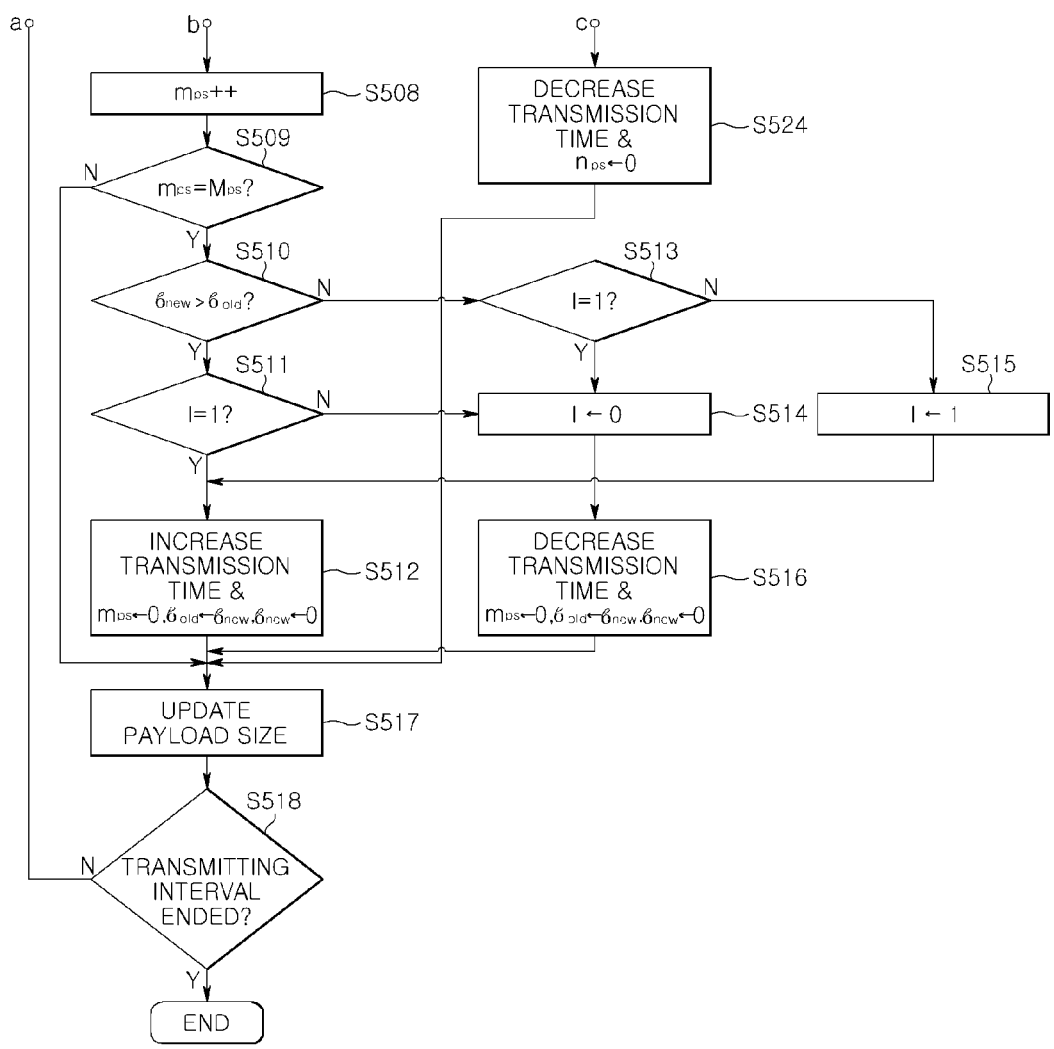

FIG. 5A and FIG. 5B are flowchart of a method of updating a signal transmission speed and a payload size associated with a data signal transmitting method, according to an embodiment of the present invention. FIG. 5A and FIG. 5B are connected each other through node A, node B and node C.

The method of FIG. 5A and FIG. 5B are algorithm that does not require estimation of characteristics of interference signal in a channel and complicated calculation, such as square roots and natural logarithm, and simultaneously updates a signal transmission speed and a payload size. The algorithm is a heuristic adaptation algorithm exploiting the fact that transmission performance calculated by dividing a data throughput S by a transmission speed R is a concave function of a signal transmission time T (=L/R) when an interference signal exists in a channel. A factor that significantly affects a probability that an interference signal and data signal may collide with each other is not a payload size but a transmission time of a payload.

The transmission performance obtained by dividing the data throughput S by the transmission speed R may be represented by Equation 17.

$$\frac{S}{R} = \frac{L}{L+b}(1 - p(R, L, T_w)) \quad \text{[Equation 17]}$$

$$= \frac{L/R}{L/R + b/R} \exp\left(-\frac{1}{T_w}\left(\frac{L}{R} + \frac{d}{R}\right)\right)$$

$$= \frac{T}{T+b'} \exp\left(-\frac{1}{T_w}(T + d')\right)$$

Here, b'=b/R and d'=d/R. However, as in Equations 8 through 11, since b' and d' are relatively less sensitive to the signal transmission speed R, S/R may be approximated according to Equation 18 below.

$$\frac{S}{R} \cong h(T, T_w) \quad \text{[Equation 18]}$$

Accordingly, by adjusting a transmission time T according to the transmission performance obtained by dividing the data throughput S by the transmission speed R, we may determine a payload size close to the optimum payload size $L_{opt}$ that maximizes the data throughput S, which is a target of one or more embodiments of the present invention. This may be justified by mathematical analysis.

Equation 19 is obtained when the optimum payload size that maximizes data throughput may be re-represented by Equation 19 from Equations 8 and 12.

$$L_{opt} = R\left(\sqrt{\left(\frac{b'}{2}\right)^2 + b'T_w} - \frac{b'}{2}\right) \quad \text{[Equation 19]}$$

$$= R \cdot g(R, T_w)$$

$$\cong R \cdot g(T_w)$$

Here, $g(R, T_w)$ is a function relatively less sensitive to the signal transmission speed R, and thus may be approximated as $g(T_w)$, and accordingly, a ratio of an optimum payload size and a signal transmission speed may be approximated as a constant. An algorithm obtained according to above details will be described with reference to FIG. 5A and FIG. 5B.

When a signal transmitting interval begins, a transmitting device sets an initial value in operation S501. A variable I is an indicator indicating whether a transmission time increased or not in the previous update of transmission time, having an initial value of 1. When I is 1, the transmission time is increased, and when I is 0, the transmission time is decreased.

The transmitting device transmits data signal to a receiving device in operation S502, and when it receives an ACK signal from the receiving device in operation S503, accumulates a transmission performance value $\delta_{new}$ in operation S504, and when it does not receive an ACK signal in operation S503, does not update the transmission performance value $\delta_{new}$, thereby measuring a ratio of a data throughput S and a transmission speed R.

Operations from S505 to S507 update a signal transmission speed when data signal is successfully transmitted. When an ACK signal is received, first, $m_{tr}$++, $n_{tr}\leftarrow 0$ is performed in operation S505, and it is determined whether $m_{tr}$ reached a threshold value $M_{tr}$ in operation S506. When it is determined that $m_{tr}$ reached the threshold value $M_{tr}$, the signal transmission speed is updated in operation S507. The signal transmission speed may be updated as described above, i.e., based on an RSSI of the ACK signal received from the receiving device.

Operations S508 through S516 update the transmission time. First, $m_{ps}$++ is performed in operation S508 and it is determined whether $m_{ps}$ reached a threshold value $M_{ps}$ in operation S509. When it is determined that $m_{ps}$ reached the threshold value $M_{ps}$, it is determined whether a transmission performance value $\delta_{new}$ of current update period is higher than a transmission performance value $\delta_{old}$ of the previous update period in operation S510. When it is determined that the transmission performance value of the current update period is higher than the transmission performance value of the previous update period, it is determined whether a transmission time was increased in the previous update period in operation S511.

When it is determined that the transmission time was increased in the previous update period, the transmission time is increased by determining that a current transmission time is shorter than an optimum transmission time, in operation S512. When it is determined that the transmission time was decreased in the previous update period, I←0 is performed in operation S514, and the transmission time is decreased by determining that the current transmission time is longer than the optimum transmission time, in operation S516. When a transmission time is updated, an amount of the update may vary according to the difference between $\delta_{new}$ and $\delta_{old}$.

When the transmission performance of the current update period is lower than that of the previous update period, it is determined whether the transmission time was increased in the previous update period in operation S513. When it is determined that the transmission time was increased in the previous update period, I←0 is performed in operation S514, and the transmission time is decreased by determining that the current transmission time is longer than the optimum transmission time, in operation S516. When it is determined that the transmission time was decreased in the previous update period, I←1 is performed in operation S515, and the transmission time is increased by determining that the current transmission time is shorter than the optimum transmission time, in operation S512.

Operations S519 through S521 are performed to decrease the signal transmission speed when transmission is not successfully performed. When it is determined that the ACK signal is not received in operation S503, first, $m_{tr}\leftarrow 0$ and $n_{tr}$++ are performed in operation S519, and it is determined whether $n_{tr}$ reached a threshold value $N_{tr}$ in operation S520. When it is determined that $n_{tr}$ reached the threshold value $N_{tr}$, the signal transmission speed is decreased by determining that a channel state is very low, in operation S521. Here, since a RSSI is not estimated, a simple method may be used, for example, a lowest signal transmission speed may be used or a signal transmission speed lower than one level may be used.

Operations S522 through S524 are performed to update the signal transmission time. First, $n_{ps}$++ is performed in operation S522, and it is determined whether $n_{ps}$ reaches a threshold value $N_{ps}$ in operation S523. When it is determined that $n_{ps}$ reached the threshold value $N_{ps}$, the transmission time is decreased by determining that the channel state is very low, in operation S524. When it is determined that $n_{ps}$ does not reach the threshold value $N_{ps}$, operation S508 is performed. Accordingly, when the signal transmission speed or the transmission time is updated, a payload size is updated in operation S517. The transmitting device may update the payload size by a value obtained by multiplying the updated transmission time and the updated signal transmission speed.

During a data signal transmitting interval in operation S518, data signal is transmitted or received in the data signal transmitting interval while repeating the above operations, and when it is determined that the data signal transmitting interval is ended, the algorithm is ended.

Meanwhile, when the signal transmission speed is updated even before a period for updating a transmission time is not reached, the transmitting device may update a payload size by multiplying the updated signal transmission speed by a transmission time defined by a ratio of a payload size and a signal transmission speed.

FIG. 6 is a flowchart of data signal receiving method according to an embodiment of the present invention. The data signal receiving method of FIG. 6 may be performed by a receiving device of a wireless communication system. It is assumed that a data signal transmitting interval is allocated to the receiving device.

In operation S610, the receiving device estimates an RSSI based on a signal received from a transmitting device before the data signal transmitting interval starts. The receiving device may estimate the RSSI based on the signal received from the transmitting device through a scheduling process.

In operation S620, the receiving device determines a signal transmission speed of a payload based on the estimated RSSI. For example, the receiving device may compare the RSSI with a minimum RSSI of each pre-set signal transmission speed, and when the transmitting device is to transmit data signal including a payload of a certain size to the receiving device, may determine a highest signal transmission speed among pre-set signal transmission speeds available to the transmitting device as the signal transmission speed. In other words, the receiving device may determine a transmission speed of a payload to be used by the transmitting device, instead of the transmitting device.

In operation S630, the receiving device may determine a payload size that maximizes a data throughput from the determined signal transmission speed and channel occupancy characteristics of an interference signal in a communication channel of the wireless communication system. Since a method of determining a payload size has been described above, details thereof are not provided again.

In operation S640, the receiving device transmits information about the determined signal transmission speed and the determined payload size to the transmitting device.

In operation S650, the receiving device may update the determined signal transmission speed and the determined payload size to increase the data throughput in consideration of signal transmission and reception characteristics in the data signal transmitting interval. In detail, the receiving device may determine the signal transmission and reception characteristics based on data signal transmitted from the transmitting device during the data signal transmitting interval, and update the signal transmission speed and the determined payload size based on the determined signal transmission and reception characteristics.

In operation S660, the receiving device transmits information about the updated signal transmission speed and the updated payload size to the transmitting device.

In operation S670, the receiving device receives data signal transmitted using the updated signal transmission speed and the updated payload size from the transmitting device.

Meanwhile, the embodiments of the present invention described above may be drafted into computer-executable programs, and may be implemented on a conventional digital computer to run the program using a computer-readable recording medium.

The computer-readable recording medium may include storage media such as a magnetic storage medium (e.g., ROMs, floppy disks, hard disks, and etc.), an optically readable medium (e.g., CD ROMs, DVDs, and etc.), and a carrier wave (e.g., transmission through the internet).

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

What is claimed is:

1. Data signal transmitting method performed by a transmitting device in a wireless communication system wherein a main communication device transmits and receives data signal comprising a header and a payload to and from a plurality of devices by periodically using a transmission frame comprising a beacon signal transmitting interval, data signal transmitting interval allocated to each of devices, and data signal transmission resting interval, the data signal transmitting method comprising:
   determining a signal transmission speed of the payload based on a received signal strength indicator (RSSI) from a receiving device after estimating the RSSI based on a signal received by a transmitting device to which the data signal transmitting interval is allocated, before the data signal transmitting interval starts;
   determining a payload size that maximizes data throughput by using the determined signal transmission speed and channel occupancy characteristics of an interference signal in a communication channel of the wireless communication system;
   updating the determined signal transmission speed and the determined payload size to increase the data throughput by exploiting the estimated signal transmission and reception characteristics in the data signal transmitting interval; and
   transmitting the data signal to the receiving device by using the updated signal transmission speed and the updated payload size.

2. The data signal transmitting method of claim 1, wherein the determining of the transmission speed of payload comprises, when data signal including a payload of a certain size is transmitted to the receiving device, comparing the estimated RSSI with a minimum RSSI for each of pre-set signal transmission speeds to determine the signal transmission speed by a highest one among the pre-set signal transmission speeds available to the transmitting device.

3. The data signal transmitting method of claim 1, wherein the determining of the signal transmission speed comprises determining the estimated RSSI by a weighted average of RSSI of each of a plurality of signals received from the receiving device before the data signal transmitting interval starts.

4. The data signal transmitting method of claim 1, wherein the determining of the payload size comprises:
   periodically performing channel sensing at a period of Ts in the data signal transmission resting interval, and estimating a channel idle interval $T_{idle}$ of an interference signal to be $\bar{n}_{idle}T_s$, where $\bar{n}_{idle}$ is an average number of times no interference signal is detected consecutively; and when the data signal is transmitted by using the determined signal transmission speed, determining the payload size that maximizes the data throughput by exploiting the header size and the channel idle interval.

5. The data signal transmitting method of claim 1, wherein the updating comprises:

re-estimating the RSSI based on a signal received from the receiving device during the data signal transmitting interval, and updating the determined signal transmission speed based on the re-estimated RSSI; and updating the payload size to maximize the data throughput or to increase the data throughput, in consideration of the signal transmission and reception characteristics in the data signal transmitting interval.

6. The data signal transmitting method of claim 5, wherein the updating of the determined signal transmission speed comprises:

when data signal transmission to the receiving device consecutively fails a pre-set number of times during the data signal transmitting interval, decreasing the determined signal transmission speed; and when data signal transmission to the receiving device consecutively succeeds a pre-set number of times during the data signal transmitting interval, updating the determined signal transmission speed in consideration of the re-estimated RSSI.

7. The data signal transmitting method of claim 5, wherein the updating of the payload size to maximize the data throughput comprises:

estimating channel occupancy characteristics of the interference signal by periodically calculating a transmission error rate of data signal at a pre-set period; and when the data signal is transmitted using the updated signal transmission speed, updating the determined payload size by a payload size that maximizes the data throughput according to the header size and a channel idle (i.e., no interference) interval, one of the estimated channel occupancy characteristics of the interference signal.

8. The data signal transmitting method of claim 5, wherein the updating of the payload to increase the data throughput comprises:

updating an effective transmission time defined by a ratio of the determined payload size and the determined signal transmission speed to increase the data throughput, by periodically comparing transmission performance of data signal at a pre-set period; and updating the determined payload size to a value obtained by multiplying the updated effective transmission time by the updated signal transmission speed.

9. The data signal transmitting method of claim 8, wherein the updating of the payload size to increase the data throughput comprises:

when the signal transmission speed is updated even before the pre-set period for updating the effective transmission time, updating the determined payload size by multiplying the effective transmission time and the updated signal transmission speed.

10. Data signal receiving method performed by a receiving device in a wireless communication system wherein a main communication device transmits and receives data signal comprising a header and a payload to and from a plurality of devices by periodically using a transmission frame comprising a beacon signal transmitting interval, data signal transmission interval allocated to each of devices, and data signal transmission resting interval, the data signal receiving method comprising:

determining a signal transmission speed of the payload based on a RSSI from a transmitting device after estimating the RSSI based on a signal received by a receiving device to which the data signal transmitting interval is allocated before the data signal transmitting interval starts;

determining a payload size that maximizes a data throughput by using the determined signal transmission speed and channel occupancy characteristics of an interference signal in a communication channel of the wireless communication system;

transmitting information about the determined signal transmission speed and the determined payload size to the transmitting device;

updating the determined signal transmission speed and the determined payload size to increase the data throughput according to signal transmission and reception characteristics in the data signal transmitting interval;

transmitting information about the updated signal transmission speed and the updated payload size to the transmitting device; and receiving the data signal that is transmitted according to the updated signal transmission speed and the updated payload size from the transmitting device.

* * * * *